May 16, 1933.　　　E. T. NOWELL　　　1,909,307
COTTON CHOPPER
Filed Nov. 7, 1932　　　3 Sheets-Sheet 1
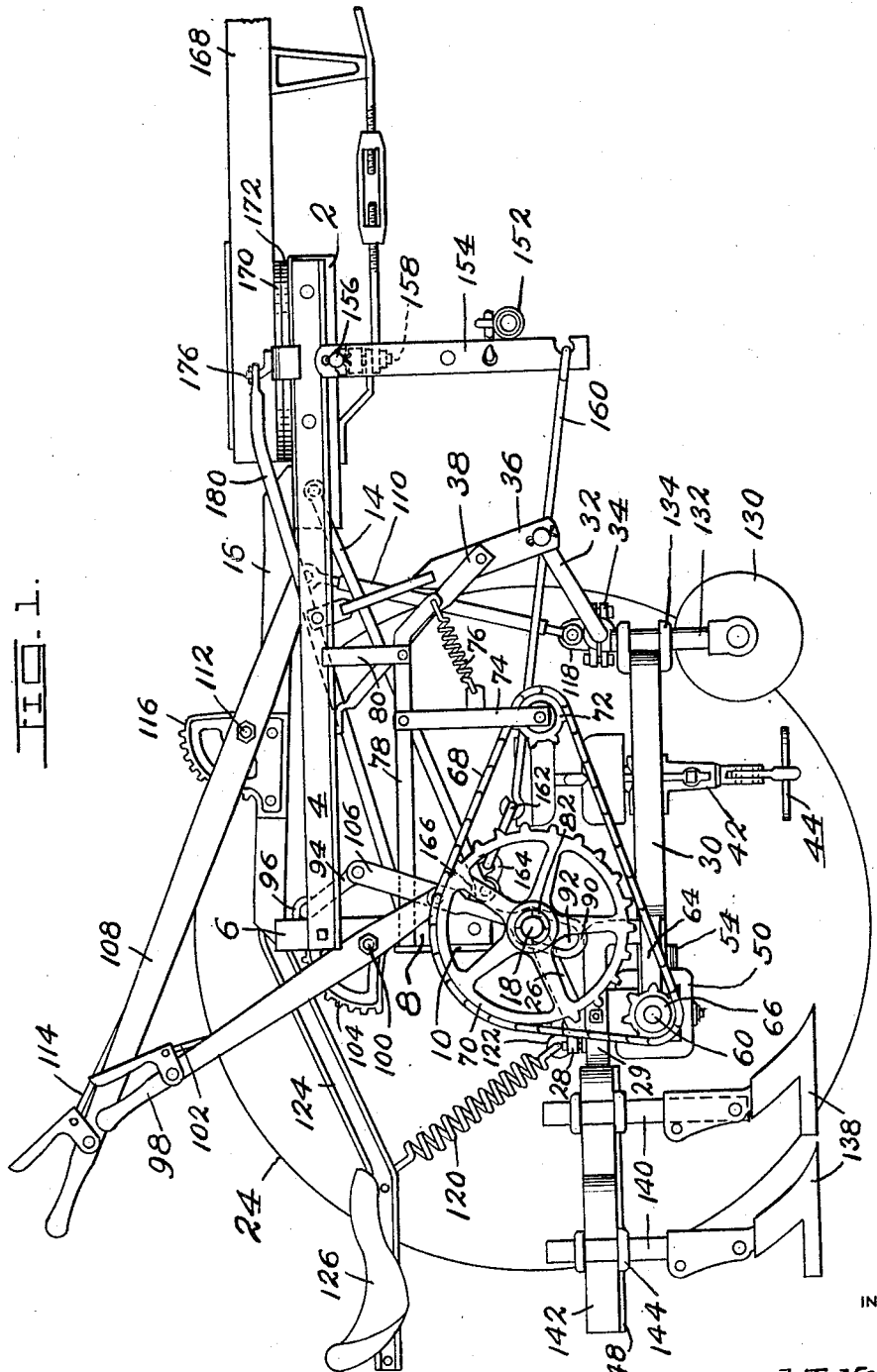
INVENTOR:
Edward T. Nowell,
BY
F. G. Fischer,
ATTORNEY.

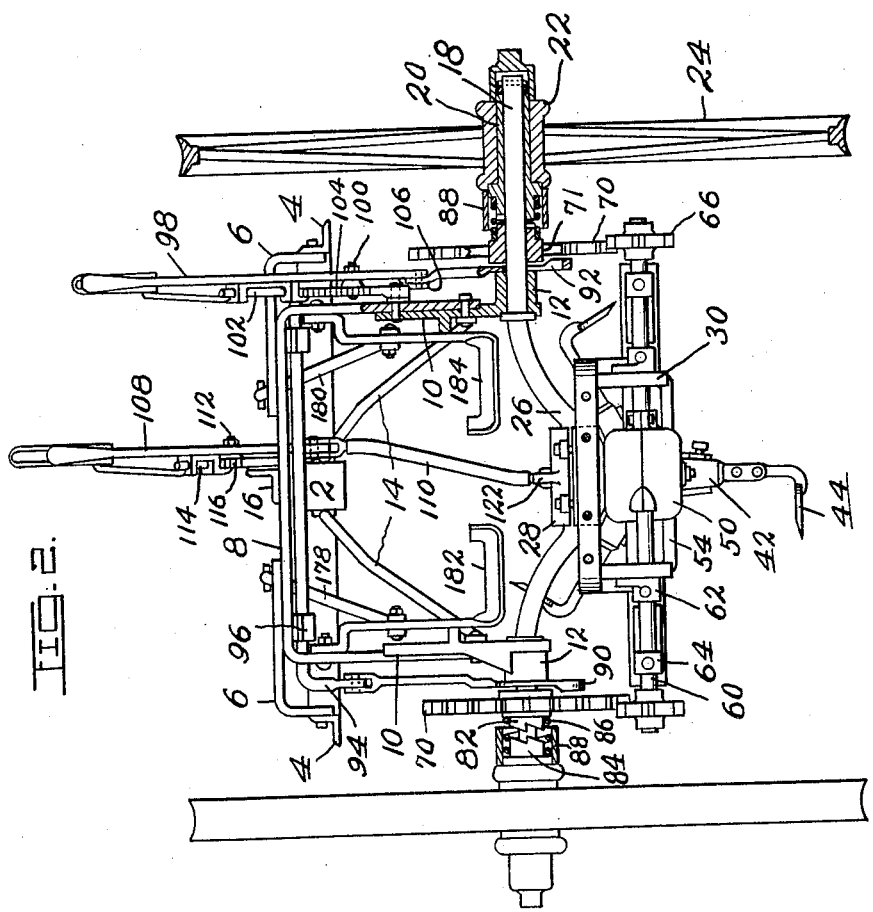

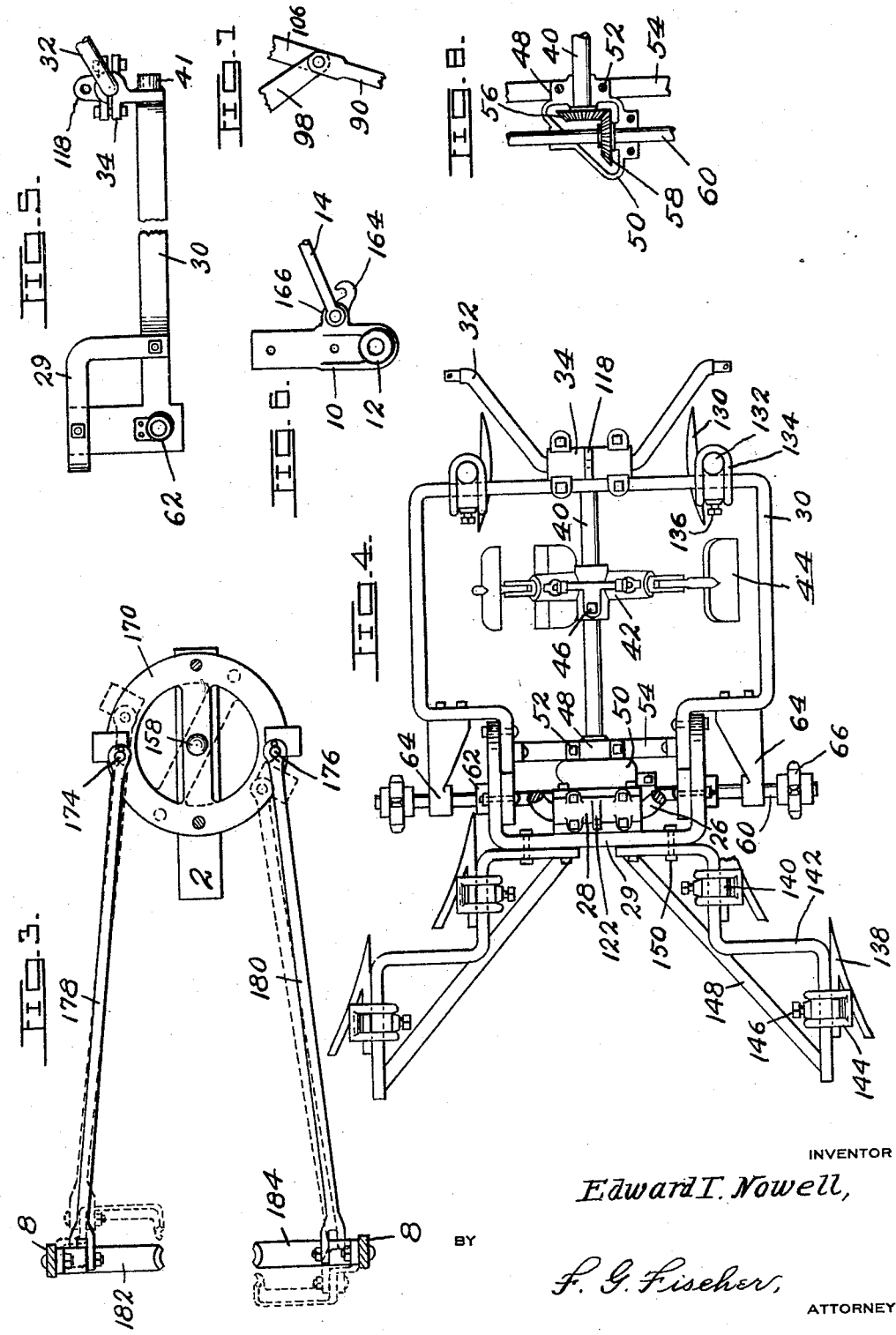

Patented May 16, 1933

1,909,307

UNITED STATES PATENT OFFICE

EDWARD T. NOWELL, OF STOTTS CITY, MISSOURI

COTTON CHOPPER

Application filed November 7, 1932. Serial No. 641,561.

This invention relates to a machine embodying a plurality of rotary hoes for blocking out superfluous cotton plants, and also appliances for cultivating the soil between the rows of plants.

The machine further embodies manually controlled mechanism whereby the rotary hoes may be thrown in or out of gear without affecting the operation of the other cultivating appliances.

Means are also provided whereby the machine may be guided to the right or left to keep from damaging the plants, or to avoid obstructions in its path.

Other features will hereinafter appear and in order that the invention may be fully understood reference will now be had to the accompanying drawings, in which:

Fig. 1 is a side elevation of the machine with one of its wheels removed.

Fig. 2 is a rear elevation of the machine with some of the parts removed.

Fig. 3 is a detail plan view of means whereby the machine may be guided to the right or left to a limited extent independently of the draft animals.

Fig. 4 is a plan view of the rotary hoes and other cultivating appliances with some of the associated parts.

Fig. 5 is a fragmentary side elevation of a cultivator frame for carrying some of the cultivating appliances.

Fig. 6 is a fragmentary side elevation of the lower portion of a wheeled frame and some of the associated parts.

Fig. 7 is a fragmentary side elevation of some of the parts employed in throwing the rotary hoes in or out of gear.

Fig. 8 is a broken detail plan view showing bevel gearing forming part of the driving mechanism for the rotary hoes.

In carrying out the invention I provide a wheeled main frame comprising a short upper beam 2, a pair of upper oppositely disposed bars 4 secured to and extending rearwardly from said beam 2, an arch 8, a pair of laterally extending arms 6 secured to the rear ends of the bars 4 and the top of the arch 8, a pair of arms 10 secured to opposite sides of the arch 8 and provided at their lower ends with axle bearings 12, a pair of braces 14 secured at their forward ends to the beam 2 and at their rear ends to the arms 10, a center brace 16 secured at its forward end to the beam 2 and at its rear end to the top of the arch 8, and an axle 18 rockably mounted in the bearings 12.

20 designates a pair of bushings journaled upon the ends of the axle 18 and splined or otherwise fixedly mounted in the hubs 22 of a pair of carrying wheels 24. The axle 18 is bent intermediate its ends into a downwardly and rearwardly extending crank 26 which extends freely through a bearing 28 fixedly secured to the central portion of a bracket 29 rigidly connected to the rear portion of a cultivator frame 30.

The cultivator frame 30 is supported at its forward end by a crank shaft 32 extending freely through a bearing 34 secured to the central forward portion of said cultivator frame 30. The ends of the crank shaft 32 are rockably mounted in a pair of hangers 36 secured at their upper ends to the bars 4 of the wheeled frame and reinforced by braces 38 secured at their lower ends to said hangers 36 and at their upper ends to the bars 4.

The rows of cotton are blocked out with a rotary cotton chopper comprising a spider 42 and a plurality of hoes 44. The hub of the spider 42 is fixedly mounted as with a set screw 46 upon a shaft 40 journaled at its forward end in a bearing 41, Fig. 5, at the lower portion of the bearing 34, and journaled at its rear portion in a bearing 48, Figs. 4 and 8, formed integral with the forward portion of a gear case 50. The gear case 50 is secured by suitable means such as bolts 52 to a cross member 54 secured at its ends to opposite sides of the rear portion of the cultivator frame 30.

Located within the gear case 50 is a bevel gear wheel 56, Fig. 8, fixedly mounted upon the rear end of the shaft 40, and a bevel gear wheel 58 fixedly mounted upon the intermediate portion of a transverse shaft 60. The transverse shaft 60 is mounted in the gear case 50 and in bearings 62 and 64 secured to the rear portion of the cultivator frame 30.
The transverse shaft 60 is provided at its ends with fixedly mounted sprocket wheels 66 driven by endless sprocket chains 68 running over large sprocket wheels 70 and held taut by tensioning devices comprising idlers 72, Fig. 1, arms 74 and respective coil springs 76. Each idler 72 is carried at the lower end of an arm 74 pivotally suspended from a supporting member 78 secured at its rear end to the arch 8 and at its forward portion to a bracket 80 depending from the adjacent bar 4. Each spring 76 is connected at its forward end to the adjacent supporting member 78 and at its rear end to the adjacent arm 74.

The sprocket wheels 70 are driven by the carrying wheels 24 through clutch members 82 and 84 formed integral with the hubs of said sprocket wheels 70 and the adjacent ends of the respective bushings 20, Fig. 2. Each clutch member 82 is yieldably held out of engagement with the companion clutch member 84 by means of a coil spring 86 enclosed in a housing 88 mounted upon the respective bushing 20. Each clutch member 82 is adapted to be thrown into engagement with its respective clutch member 84 by means of a wedge member 90 interposed between the respective sprocket wheel 70 and the adjacent axle bearing 12. Each wedge member 90 has a longitudinal slot 92 through which the axle 18 extends.

One of the wedge members 90 is pivotally connected at its upper end, Fig. 2, to one end of a crank shaft 94 rockably mounted in bearings 96 secured to the arch 8. The other wedge member 90 is pivotally connected at its upper end to a hand lever 98 fulcrumed at 100 and having the usual latch mechanism 102 for engagement with a notched sector 104 whereby said hand lever may be held at any point of its adjustment. The hand lever 98 is connected by a link 106, Figs. 1, 2 and 7, to the adjacent end of the crank shaft 94.

The cultivator frame 30 and parts connected thereto are raised and lowered by means of a hand lever 108 and a link 110. The hand lever 108 is fulcrumed at 112 and provided with the usual latch mechanism 114 for engagement with a notched sector 116 whereby said hand lever may be held at any point of its adjustment. The link 110 is pivotally connected at its upper end to the forward end of the lever 108 and at its lower end to an ear 118 integral with the bearing 34. The driver is assisted in raising the cultivator frame 30 to the position disclosed by Fig. 1, by means of a retractile spring 120 connected at its lower end to an ear 122 on the axle bearing 28. The upper end of the spring 120 is connected to a beam 124 secured to the arch 8 and provided at its rear end with a seat 126 for the driver.

Referring again to the cultivator frame 30, 130 designates a pair of disks arranged in advance of the cotton chopper and provided with upwardly extending shanks 132 mounted in clamp members 134 secured to the forward transverse portion of the cultivator frame 30 by set screws 136, Fig. 4. On loosening the set screws 136 the shanks 132, which are cylindrical in cross section, may be turned axially to adjust the disks 130 either parallel with or at any desired angle to the line of travel of the machine. The foregoing arrangement also permits the disks 130 to be adjusted towards or away from each other so that they may be spaced in any desired relation with the row of plants under cultivation.

In addition to the disks 130, I also provide other cultivating appliances 138 mounted on upwardly extending shanks 140 secured to oppositely-disposed beams 142 by means of clamp members 144 and set screws 146. On loosening the screws 146 the cultivating appliances 138 may be adjusted forward or backward upon the respective beams 142 which are bent as shown by Fig. 4 to space the rear cultivating appliances 138 farther apart than their companions. Braces 148 are provided to reinforce the beams 142. The forward ends of the beams 142, which are bent at rightangles to the length thereof, are removably connected as by bolts 150 to the rear transverse portion of the bracket 29.

When a team is used to pull the machine I provide a pair of single trees 152 which are adjustably connected to hangers 154 suspended from the ends of a double tree 156 pivotally mounted upon a king bolt 158. The lower ends of the hangers 154 are connected to the forward ends of a pair of draft rods 160 connected at their rear ends to links 162 engaging over hooks 164, Figs. 1 and 6, secured to ears 166 projecting forwardly from the arms 10.

168 designates a draft tongue which is fixed at its rear end to the upper annulus 170 of a fifth wheel having a lower annulus 172 fixed to the beam 2. The two members of the fifth wheel are held in concentric relation to each other by means of the king bolt 158. The upper annulus 170 is provided with oppositely disposed lugs 174 and 176 upon which the forward ends of connecting rods 178 and 180, respectively, are pivotally mounted. The rear ends of the connecting rods 178 and 180 are pivotally connected to stirrups 182 and 184, respectively, Figs. 2 and 3, which in turn are pivotally connected to upper opposite sides of the arch 8.

Briefly stated the operation of the machine is as follows: When a row of plants is reached the cultivator frame 30 is lowered by swinging the hand lever 108 upwardly. This operation causes the crank portions of the axle 26 and the shaft 32 to swing downwardly and lower the frame 30 until the disks 130 and the cultivating appliances reach the proper depth in the soil. The hand lever 98 is then pulled downwardly to raise the wedge members 90 against the hubs 71 of the sprocket wheels 70 and thereby force the latter outwardly upon the axle 18 to engage the clutch members 82 with the clutch members 84. The cotton chopper is then rotated through the intermediary of the sprocket mechanism 70, 68, and 66 and the bevel gears 58, 56 and the shaft 40. As the machine advances along a row of cotton the disks 130 and the cultivating appliances 138 pulverize the soil and destroy weeds at each side of the row, while the hoes 44 block or cut out the plants at intervals.

While the machine is intended chiefly for blocking out and cultivating cotton, it can also be used to advantage for performing these functions on sugar beets and other plants requiring cultivation of this character. When desired the disks 130 and appliances 138 may be used without the cotton chopper by throwing the latter out of gear through the intermediary of the hand lever 98.

The fifth wheel construction 170, 172, the connecting rods 178, 180 and the stirrups 182, 184 enable the driver to guide the machine to the right or left to avoid plants or obstructions in the path of the wheels 24 by pushing forwardly upon one or the other of said stirrups.

From the foregoing description it will be understood that I have provided a machine which is well adapted for the purpose intended and while I have illustrated a preferred embodiment of the invention I reserve all rights to such changes and modifications thereof as properly fall within the spirit and scope of the invention as claimed.

Having thus described my invention, what I claim and desire to secure by Letters Patent, is:

1. In a machine of the character described, a wheeled main frame, a cultivator frame operably suspended from said wheeled frame, a hand lever for effecting vertical adjustment of said cultivator frame, a bearing secured to the forward portion of said cultivator frame, a gear case at the rear portion of the cultivator frame, a shaft extending longitudinally of the cultivator frame and journaled in the bearing and said gear case, a cotton chopper fixedly mounted upon said shaft, bearings at the sides of the cultivator frame, a shaft extending transversely of the cultivator frame and journaled in the gear case and the last-mentioned bearings, bevel gears in the gear case and through which the transverse shaft drives the longitudinal shaft, sprocket mechanism for driving the transverse shaft, clutch members through which the wheels of the main frame drive said sprocket mechanism, wedge members for throwing said clutch members in gear, a crank shaft rockably mounted on the wheeled frame for simultaneously operating said clutch members, and a manually controlled lever for actuating said crank shaft.

2. In a machine of the character described, a wheeled main frame, a cultivator frame operably suspended from said wheeled frame, a hand lever for effecting vertical adjustment of said cultivator frame, a bearing secured to the forward portion of said cultivator frame, a gear case at the rear portion of the cultivator frame, a shaft extending longitudinally of the cultivator frame and journaled in the bearing and said gear case, a cotton chopper fixedly mounted upon said shaft, bearings at the sides of the cultivator frame, a shaft extending transversely of the cultivator frame and journaled in the gear case and the last-mentioned bearings, bevel gears in the gear case and through which the transverse shaft drives the longitudinal shaft, sprocket mechanism for driving the transverse shaft, clutch members through which the wheels of the main frame drive said sprocket mechanism, wedge members for throwing said clutch members in gear, a crank shaft rockably mounted on the wheeled frame for simultaneously operating said clutch members, a manually controlled lever for actuating said crank shaft, a bracket secured to the rear portion of the cultivator frame, a bearing secured to said bracket and supported by the axle of the wheeled frame, a plurality of cultivator appliances, and a pair of beams secured to the rear portion of the bracket and carrying the cultivator appliances, said beams being bent in opposite directions to position the rearmost appliances to one side of the foremost appliances.

3. In a machine of the character described, a wheeled main frame, a cultivator frame operably suspended from said wheeled frame, a hand lever for effecting vertical adjustment of said cultivator frame, a bearing secured to the forward portion of said cultivator frame, a gear case at the rear portion of the cultivator frame, a shaft extending longitudinally of the cultivator frame and journaled in the bearing and said gear case, a cotton chopper fixedly mounted upon said shaft, bearings at the sides of the cultivator frame, a shaft extending transversely of the cultivator frame and journaled in the gear case and the last-mentioned bearings, bevel gears in the gear case and through which the transverse shaft drives the longitudinal shaft, sprocket mechanism for driving the transverse shaft, clutch members through which the wheels of the main frame drive said sprocket mechanism, wedge members for throwing said clutch members in gear, a crank shaft rockably mounted on the wheeled frame for simultaneously operating said clutch members, a manually controlled lever for actuating said crank shaft, disks adjustably mounted at the forward portion of the cultivator frame, a bracket secured to the rear portion of the cultivator frame, a bearing secured to said bracket and supported by the axle of the wheeled frame, a plurality of cultivator appliances, and a pair of beams secured to the rear portion of the bracket and carrying the cultivator appliances, said beams being bent in opposite directions to position the rearmost appliances to one side of the foremost appliances.

4. In a machine of the character described, a wheeled main frame, a cultivator frame operably suspended from said wheeled frame, a hand lever for effecting vertical adjustment of said cultivator frame, a bearing secured to the forward portion of said cultivator frame, a gear case at the rear portion of the cultivator frame, a shaft extending longitudinally of the cultivator frame and journaled in the bearings and said gear case, a cotton chopper fixedly mounted upon said shaft, bearings at the sides of the cultivator frame, a shaft extending transversely of the cultivator frame and journaled in the gear case and the last-mentioned bearings, bevel gears in the gear case and through which the transverse shaft drives the longitudinal shaft, sprocket mechanism for driving the transverse shaft, clutch members through which the wheels of the main frame drive said sprocket mechanism, wedge members for throwing said clutch members in gear, a crank shaft rockably mounted on the wheeled frame for simultaneously operating said clutch members, a manually controlled lever for actuating said crank shaft, a bracket secured to the rear portion of the cultivator frame, a rectractile spring secured to the last-mentioned bearing and the wheeled frame to assist in lifting the cultivator frame, a bearing secured to said bracket and supported by the axle of the wheeled frame, a plurality of cultivator appliances, and a pair of beams secured to the rear portion of the bracket and carrying the cultivator appliances, said beams being bent in opposite directions to position the rearmost appliances to one side of the foremost appliances.

5. In a machine of the character described, a wheeled main frame including an axle having a downwardly and rearwardly extending crank, a crank shaft supported in advance of the axle by said wheeled frame, a cultivator frame, a bearing on the forward portion of said cultivator frame and supported by said crank shaft, manually controlled means connected to said bearing for raising and lowering the cultivator frame, a bracket secured to the rear portion of the cultivator frame, a bearing secured to said bracket and loosely mounted upon the crank of the axle, a shaft extending longitudinally of the cultivator frame, bearings on the cultivator frame in which the last-mentioned shaft is journaled, a cotton chopper mounted upon said shaft, mechanism driven by the wheels of the main frame for driving the last-mentioned shaft, beams secured to the rear portion of the bracket, and cultivating appliances carried by said beams.

6. In a machine of the character described, a cultivator frame having upwardly extending rear terminals, a bracket secured to the sides and said terminals of the cultivator frame, bearings secured to the forward portion of the cultivator frame and the rear portion of the bracket, a crank shaft extending freely through the bearing on the cultivator frame, a crank axle extending freely through the bearing on the bracket, a pair of carrying wheels in which the ends of the axle are mounted, a guidable main frame mounted upon the axle, manually controlled means mounted upon said main frame for raising and lowering the cultivator frame, a shaft extending longitudinally of and journaled in bearings on the cultivator frame, a cotton chopping appliance mounted upon said shaft, mechanism driven by the carrying wheels for driving the last-mentioned shaft, beams detachably connected to the rear portion of the bracket, and cultivating appliances carried by said beams.

In testimony whereof I affix my signature.

EDWARD T. NOWELL.